Jan. 15, 1963   R. T. DRAKE   3,073,016
PUNCH FOR ASSEMBLING RUBBER BUSHINGS
Filed June 18, 1959   2 Sheets-Sheet 2

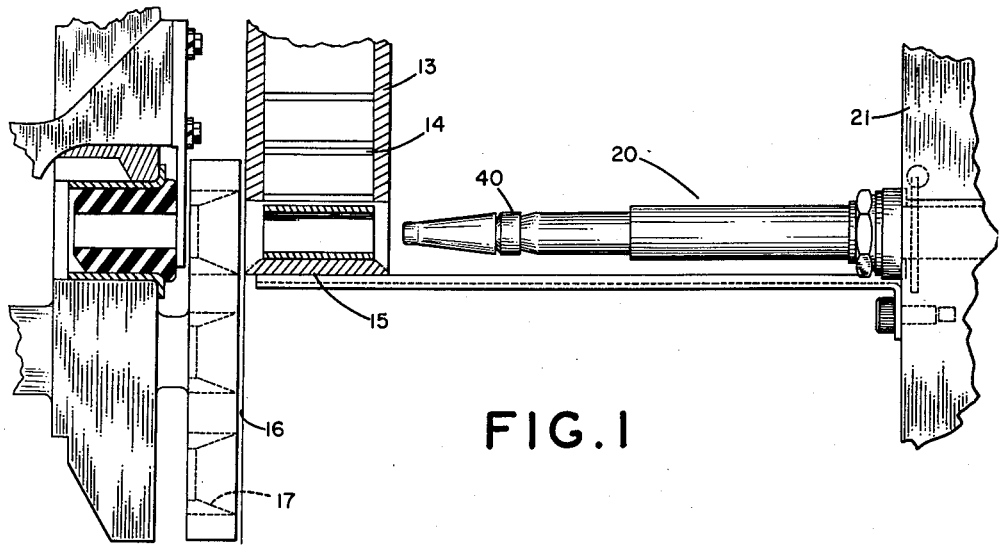
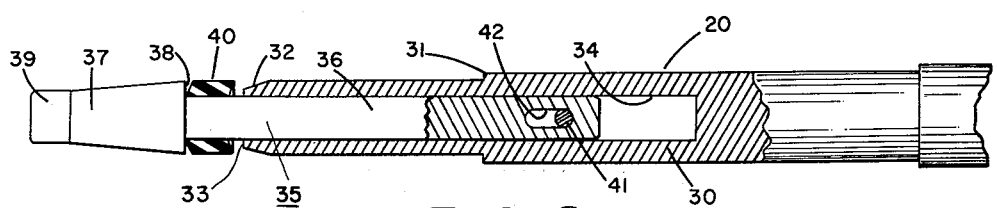
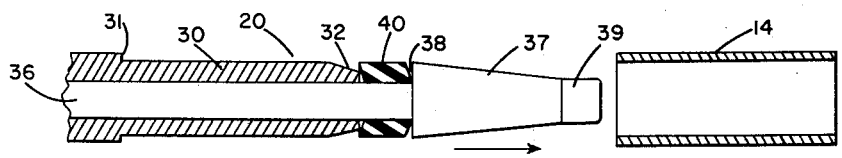
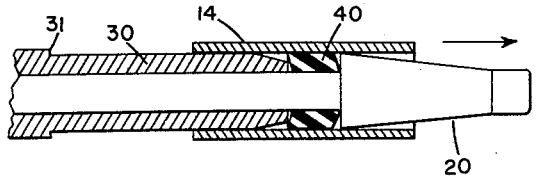
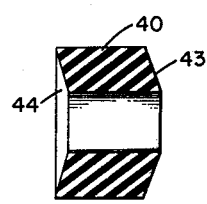

*INVENTOR.*
ROBERT T. DRAKE
BY
*Eber J. Hyde*
ATTORNEY

United States Patent Office 3,073,016
Patented Jan. 15, 1963

3,073,016
PUNCH FOR ASSEMBLING RUBBER BUSHINGS
Robert T. Drake, Norwalk, Ohio, assignor to Clevite
Harris Products, Inc., Milan, Ohio, a corporation of
Ohio
Filed June 18, 1959, Ser. No. 821,221
7 Claims. (Cl. 29—235)

Machines have been developed for automatically assembling resilient rubber bushings of the type comprised of an outer metal sleeve, a rubber insert sleeve, and an inner metal sleeve in which the rubber sleeve is under radial compression to establish strong frictional bonds between the rubber insert and the inner and outer metal sleeves. These machines usually assemble the rubber insert inside the outer metal sleeve and then they forcefully insert the inner metal sleeve with considerable interference fit within the bore in the rubber insert. This assembly operation requires that a punch pick up a metal sleeve and drive it into the rubber sleeve, lubrication being provided to facilitate the operation. The punch then is withdrawn and is ready for another cycle. It is very important that the leading end of the punch be tapered so that during assembly the internal diameter of the rubber bushing will be expanded, thereby to facilitate driving the metal sleeve into the rubber-like bushing without the leading edge of the metal sleeve cutting the rubber-like material. In the past the tapered head of the punch had a maximum diameter not greater than the internal diameter of the metal sleeve to be assembled, as otherwise the sleeve could not be slipped over the punch. This meant, however, that the metal sleeve could not readily be driven into position in the rubber sleeve because the thickness of the metal sleeve interfered with the rubber, and the sharp leading edge of the metal sleeve often cut the rubber, causing unsatisfactory assembly conditions and high scrap loss.

Attempts have been made to provide an expanding rubber sleeve around the tapered head of the punch, and to expand the rubber sleeve during assembly to a diameter equal to the outside diameter of the metal sleeve. These attempts have entailed complicated mechanism and complicated timing problems, and have not entirely solved the problem caused by the leading edge of the metal sleeve engaging and tearing the rubber bushing. One such attempt utilized an expanding pilot which, under the control of hydraulic equipment, increased the maximum diameter of a rubber sleeve to that of the O.D. of the metal sleeve, and after the metal sleeve had been positioned in the rubber sleeve the pilot was either positively stretched axially or was allowed to return to its previous condition where its maximum outer diameter was less than the internal diameter of the metal sleeve, thereby to facilitate slipping the next metal sleeve over the head of the punch or pilot preparatory to the next assembly cycle. Such a device did not require that the pilot be removed during each cycle because the metal sleeve could be slipped over the pilot when the diameter of the pilot was small, and thereafter by a positive hydraulic action the diameter of the pilot was expanded so that its maximum diameter was equal to that of the outer diameter of the metal sleeve. This mechanism required that the expansible rubber pilot be secured to the actuating mechanism, and when it was expanded a notch was established between the back edge of the rubber pilot and the forward edge of the metal sleeve to be inserted. Thus when the pilot and sleeve were forcefully driven into the rubber sleeve the edge of the metal sleeve at the notch frequently tore the rubber sleeve member.

In order to retain the advantages of an assembly device having an expanding pilot or punch, and in order to obviate the tearing of the rubber insert a new punch or pilot has been developed wherein the rubber-like section, in its expanded condition, provides a smooth taper out to the full outer diameter of the metal sleeve, and which provides a smooth unnotched transition from the rubber-like pilot to the metal sleeve in order to prevent tearing of the rubber sleeve.

It is an object of the invention to provide a pilot or punch for machines for automatically assembling rubber insert bushings wherein rapid action of the machine is retained and rejects due to torn rubber parts are greatly reduced.

A further object of the invention is to provide a new and more effective pilot for a machine for automatically assembling rubber bushings.

For a better understanding of the present invention, together with other and further objects thereof, reference is had to the following description taken in connection with the accompanying drawings, and its scope will be pointed out in the appended claims.

With reference to the drawings there is shown in FIGURE 1 a portion of a machine for automatically assembling rubber bushings, and showing the pilot or punch in side view.

FIGURE 2 is a sectional side view of the pilot or punch in its normal condition.

FIGURE 3 is a sectional side view of the punch as it is about to pick up a metal sleeve to be assembled.

FIGURE 4 is a sectional side view showing the punch as it is picking up the metal sleeve.

FIGURE 10 is an enlarged sectional side view showing the rubber-like pilot section.

Figure 5:
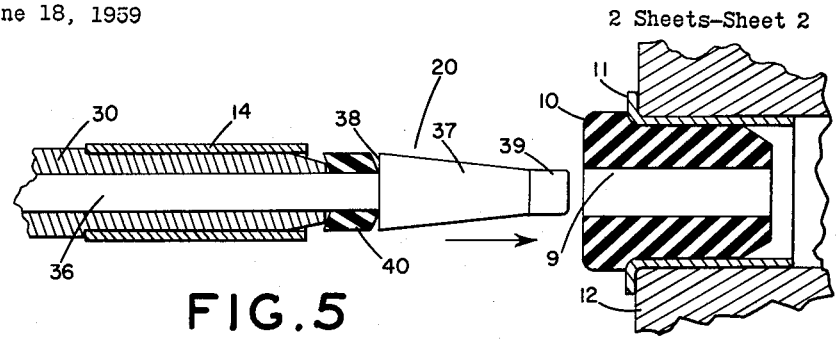
FIGURE 5 is a side view showing the metal sleeve in place on the punch and showing the head end of the punch approaching the rubber sleeve within which the metal sleeve is to be assembled.

An aspect of the present invention lies in the provision of a punch for use in assembling a hollow metal sleeve within a rubber sleeve, wherein the punch comprises a hollow barrel member within which there is reciprocally mounted the shaft of a plunger device, and an enlarged head portion of the shaft is located outside of and is spaced away from the barrel member. The head portion has a larger diameter than the shaft and tapers inwardly toward the front end thereof. A rubber-like band is mounted around the shaft at a location between the head portion and the barrel member so that the band is compressed as the barrel member and the plunger move toward each other as the head portion pushes against the rubber sleeve.

With reference to the drawings there is shown in FIGURE 1 portions of a machine for automatically assembling a resilient rubber bushing of the type comprised of an outer metal sleeve, a rubber insert sleeve and a metal inner sleeve, wherein the rubber sleeve is under radial compression to establish strong frictional bonds between the rubber sleeve and the two metal sleeves.

In the assembly process the rubber sleeve 10 is placed inside the outer metal sleeve 11 by means not shown, and the sub-assembly 10—11 is held in indexed position by a rotating index device 12 of the assembling machine. Adjacent this rotating index device 12 there is a slide 13 down which the inner metal sleeves 14 roll until they engage a stop 15. Connected to the rotating index device 12 for rotation therewith is a sleeve positioning wheel 16, with a plurality of funnel-shaped apertures 17 therein, one for each assembly station in the rotating index device 12. As the index device 12 rotates and positions a subassembly 10—11 in aligned relation with a positioned metal sleeve 14, there is one of the funnel-shaped apertures 17 located therebetween.

In timed relation with the positioning of the subassembly 10—11 and with the positioning of the metal sleeve 14 a punch device 20 moves toward the metal sleeve 14. The axis of the punch is aligned with the axis of the metal sleeve 14, and the end of the punch 20 is tapered so that it picks up the sleeve 14 and moves it through the funnel-shaped aperture 17 into registered engagement with the rubber sleeve portion, and thereafter forces the metal inner sleeve 14 into the sub-assembly 10, 11, thereby completing the assembly of the metal-rubber bushing. The punch device then backs out and another metal sleeve 14 falls into place. Wheel 16 rotates to bring another sub-assembly 10, 11 into indexed position, and the step is repeated. At no time is the punch 20 disconnected from its actuating base 21, as in certain prior art devices.

The reason why the punch does not have to be disconnected in order to thread it through the metal sleeve 14 lies in the special construction of the punch, and this is the subject matter of the claims of the present application.

The punch 20 is shown in FIGURE 2, and comprises an elongated hollow metal sleeve or barrel member 30 having a collar 31 and having an inclined truncated portion 32 adjacent its end 33. Within the bore 34 of the hollow metal sleeve or barrel member 30 there is mounted for reciprocal motion a plunger indicated generally by the reference character 35. The plunger comprises a shaft portion 36 which is slidably mounted within the bore 34 and an enlarged head portion 37 located outside of and spaced away from the barrel member 30. The enlarged head portion 37 has its maximum diameter larger than the diameter of the shaft 36 thereby forming a shoulder 38, and it tapers inwardly and away from the barrel member 30 toward the front end thereof 39.

A rubber-like band 40 is loosely mounted around the shaft 36 at a location between the shoulder 38 of the head 37 and the shoulder 33 on the barrel member 30. A pin 41 extends across the bore 34 in the barrel member 30, and through a slot 42 in the shaft 36. As shown, the slot 42 extends a short distance axially of the shaft 36, thereby establishing a lost motion connection between shaft 36 and barrel 30, providing for a small amount of relative axial movement between the two parts.

FIGURE 3 shows the relative position of the inner metal sleeve 14 and the punch 20 as the punch is moving toward the metal sleeve preparatory to picking up the metal sleeve and driving it into the sub-assembly 10—11, not shown. One face of the rubber-like collar 40 is against the shoulder 38 and the barrel 30 is up against the other face of the collar 40. The force to project the punch forward is derived from the base 21 and is transmitted through the barrel 30 and through the rubber-like collar 40 to the plunger device 35. It is to be noted that the internal diameter of the inner metal sleeve 14 is substantially equal to the diameter of the enlarged portion of the head 37 and that the diameters of the rubber-like member 40 and of the barrel member 30 forward of the shoulder 31 are also not greater than the internal diameter of the metal sleeve 14. Consequently, as the punch 20 approaches the metal sleeve 14 the sleeve will readily slip over the punch (as shown in FIGURE 4) until the end of the metal sleeve engages the shoulder 31, at which point the metal sleeve 14 will be carried along with the punch, as shown in FIGURE 5.

Figure 6:
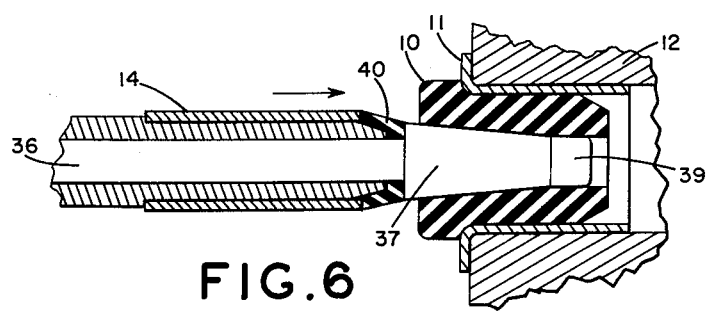
FIGURE 6 is a sectional side view showing the punch partially within the rubber sleeve.

FIGURE 5 shows the punch 20 after it has picked up the metal sleeve 14 and as it is approaching the sub-assembly 10—11 mounted in fixed position in the rotary holding device 12. The diameter of the end 39 of the plunger 35 is substantially equal to the internal diameter of the rubber-like sleeve 10, and as the plunger passes into the bore 9 in the rubber-like sleeve the enlarged tapered portion 37 begins to push the rubber-like material ahead of the plunger and to the side thereof. This exerts considerable resistance force on the head 37, and as the barrel 30 continues to push the rubber-like sleeve is severely distorted as relative motion takes place between the barrel 30 and the plunger 35, as shown in FIGURE 6. The distortion of the rubber-like sleeve 40 causes it to expand radially until its outside diameter is approximately equal to the outside diameter of the metal sleeve 14, thereby filling the entire space between the shoulder 38 and the metal sleeve 14. This prevents the leading edge of the metal sleeve from tearing the rubber bushing 10 as it is forcefully driven into it. Throughout the assembly operation lubricants are used which facilitate pushing the tapered head 37, the rubber-like band 40 and the metal sleeve 14 into the rubber sleeve 10. After assembly these lubricants are absorbed in the rubber and disappear as an effective lubricant, thereby establishing the high frictional forces which are desirable.

Figure 7:
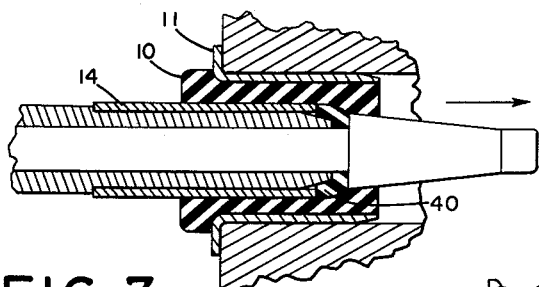
FIGURE 7 is a sectional side view showing the metal sleeve being assembled within the rubber sleeve.
Figure 8:
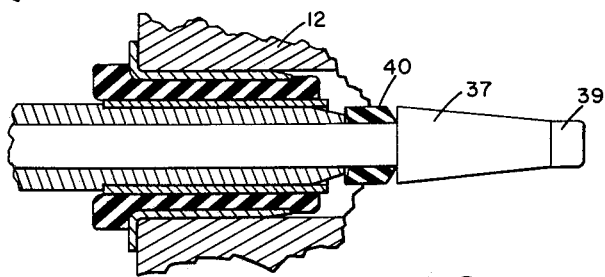
FIGURE 8 is a sectional side view showing the pilot or punch completely through the rubber sleeve and showing the inner metal sleeve in place.
Figure 9:
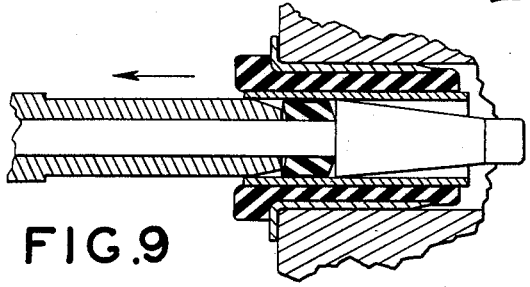
FIGURE 9 shows the pilot being retracted from the assembly.

FIGURE 7 shows the metal sleeve 14 moving through the rubber sleeve 10 and shows the shape of the rubber-like band 40. When the rubber-like band 40 is completely through the rubber sleeve 10 and the resistance to the penetration is reduced to zero, the rubber-like band 40 returns to its original shape, pushing the head of the plunger 35 away from the barrel member 30 in doing so, as shown in FIGURE 8. Thereafter, as shown in FIGURE 9, the punch may be withdrawn through the metal sleeve 14 since the external diameter of the rubber-like band 40 has been reduced until it is equal to or less than the internal diameter of the metal sleeve 14.

FIGURE 10 is a cross-sectional view showing the best form of the rubber-like band 40. It is, in effect, a bored cylinder having one end 43 beveled and its other end 44 concave.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A punch for use in assembling a hollow metal sleeve within a hollow rubber sleeve, comprising a hollow barrel member, a plunger having a shaft portion axially slidably disposed within, and having one end normally projecting from one end of, said hollow barrel member, a radially enlarged head portion on said projecting shaft portion normally axially spaced away from said end of the barrel member, said head portion being of a diameter larger than said shaft portion and tapering inwardly from said shaft portion toward the front end thereof, means defining a lost motion connection between said plunger and barrel member establishing a limiting position of axial displacement of said head portion away from said end of the barrel member and a rubber-like band loosely mounted around said shaft portion at a location between said head portion and said barrel member, said band being normally undistorted and having an axial dimension not greater than the distance between said end of the barrel member and head portion at said limiting position whereby said rubber-like band is compressed as said plunger head portion moves toward said barrel member end as said head portion engages and pushes against said hollow rubber sleeve thereby, as said hollow metal sleeve is forced into said hollow rubber sleeve, causing said rubber-like band to expand radially to a diameter substantially equal to the outside diameter of said hollow metal sleeve.

2. A punch as set forth in claim 1, further characterized by said rubber-like band which is loosely mounted around said shaft portion of said plunger being free of attachment to said plunger.

3. A punch as set forth in claim 2, further characterized by said rubber-like band comprising a cylinder which is beveled at its ends, the said beveled end faces being approximately parallel to each other.

4. A punch as set forth in claim 3, further characterized by said rubber-like band having an inner face and an outer face, the inner face of said rubber-like band being tapered with respect to the outer face thereof.

5. A punch for use in assembling a hollow metal sleeve within a hollow rubber sleeve, comprising a hollow barrel member, a plunger having a shaft portion mounted within said hollow barrel member for limited axial relative movement with respect thereto and having one end normally projecting from one end of said barrel member, a head portion on said projecting shaft portion normally axially spaced away from said barrel member end by a given amount, said head portion being of a diameter larger than said shaft portion and tapering inwardly from said shaft portion toward the forward end thereof, means defining a lost motion connection between said plunger and barrel member defining a limiting position of axial displacement of said head portion away from said end of the barrel member, and a rubber-like band mounted around said shaft portion at a location between said head portion and said barrel member and being free of attachment to said plunger; said rubber band having an axial dimension not greater than the distance between said barrel member end and head portion at said limiting position, the space between said head portion and said barrel member end and the amount of relative axial motion between said barrel member and said plunger being so related that when said head portion engages and pushes against said hollow rubber sleeve the rubber band is compressed between said head member and the said barrel member thereby causing said rubber-like band to expand radially to a diameter substantially equal to the outside diameter of said hollow metal sleeve.

6. A punch for use in assembling a hollow metal sleeve within a hollow rubber sleeve, comprising a hollow barrel member having a forward end which is truncated and which is beveled to present a front edge face perpendicular to the longitudinal axis of said barrel member and a taper-face extending from said front edge face at an angle to said axis and adapted to receive a hollow metal sleeve whose end face will lie at the approximate juncture of said taper with said hollow barrel member, a plunger having a shaft portion mounted within said hollow barrel member and having one end normally projecting from one end of said barrel member, a rigid head portion on said projecting shaft portion normally axially spaced away from said barrel member end, said head portion having a portion with a diameter larger than said shaft portion and approximately equal to the outer diameter of said hollow barrel member and said head portion further having an outer face which tapers inwardly toward the front thereof, the larger diameter portion forming with said sleeve end and taper portion a space, means defining a lost motion connection between said plunger and barrel member establishing a limiting position of axial displacement of said head portion away from said end of the barrel member, and a rubberlike band mounted around said shaft portion at a location between said head portion and said barrel member and being free of direct connection to said barrel member and to said plunger, said rubber-like band having an axial dimension not greater than the distance between said barrel member end and head portion at said limiting position and abutting against said front edge face and expanding outwardly and over said taper-face as said plunger telescopes within said barrel member during an assembly operation as said head portion engages and pushes against the hollow rubber sleeve whereby said sleeve is expanded into said space.

7. A punch as set forth in claim 6, further characterized by said rubber-like band comprising a cylinder beveled in the same direction at both ends to establish a convex end and a concave end and mounted around said shaft portion with said concave end adjacent said front edge face of said hollow barrel member.

References Cited in the file of this patent
UNITED STATES PATENTS 1,603,471   Johnson et al. _____ Oct. 19, 1926

FOREIGN PATENTS 780,875   Great Britain _____ Aug. 7, 1957